United States Patent
Balakrishnan et al.

(10) Patent No.: US 10,542,077 B1
(45) Date of Patent: Jan. 21, 2020

(54) EVENT-DRIVEN NOTIFICATION AND NETWORK SERVICE BUS FOR A CLOUD EXCHANGE

(71) Applicant: Equinix, Inc., Redwood City, CA (US)

(72) Inventors: Senthil Kumar Balakrishnan, Santa Clara, CA (US); Parveen Kumar, Fremont, CA (US); Jaganathan Jeyapaul, San Jose, CA (US); Brian J. Lillie, Los Altos, CA (US); Harshith Bhaskar Vakkaligara, Fremont, CA (US)

(73) Assignee: EQUINIX, INC., Redwood City, CA (US)

( * ) Notice: Subject to any disclaimer, the term of this patent is extended or adjusted under 35 U.S.C. 154(b) by 232 days.

(21) Appl. No.: 15/269,926

(22) Filed: Sep. 19, 2016

Related U.S. Application Data

(60) Provisional application No. 62/338,863, filed on May 19, 2016.

(51) Int. Cl.
  *H04L 29/08* (2006.01)
  *H04L 12/761* (2013.01)
  *H04L 12/721* (2013.01)

(52) U.S. Cl.
  CPC .......... *H04L 67/1002* (2013.01); *H04L 45/16* (2013.01); *H04L 45/70* (2013.01)

(58) Field of Classification Search
  None
  See application file for complete search history.

(56) References Cited

U.S. PATENT DOCUMENTS

| | | | |
|---|---|---|---|
| 2008/0178271 A1* | 7/2008 | Gajjala | G06F 21/33 726/6 |
| 2012/0254396 A1* | 10/2012 | Prahalad | H04L 12/1895 709/224 |
| 2014/0123028 A1* | 5/2014 | Kamity | H04N 21/2743 715/753 |
| 2016/0036985 A1* | 2/2016 | Koren | G06Q 30/016 379/211.01 |
| 2016/0127454 A1 | 5/2016 | Maheshwari et al. | |
| 2016/0134527 A1* | 5/2016 | Kwak | H04L 45/586 370/352 |
| 2016/0337473 A1 | 11/2016 | Rao | |
| 2017/0295257 A1* | 10/2017 | Bao | H04L 67/34 |

* cited by examiner

*Primary Examiner* — Younes Naji
(74) *Attorney, Agent, or Firm* — Shumaker & Sieffert, P.A.

(57) ABSTRACT

In one example, a cloud exchange comprises an interconnection platform of a network data center to configure a plurality of interconnection assets of the network data center to interconnect customer networks of a plurality of customer networks co-located in the network data center, the interconnection platform comprising: a network event unit controller configured to receive an indication of a network event of an interconnection asset of the plurality of interconnection assets; generate, in response to the network device report message, one or more network event messages based on the network event, wherein each of the network event messages includes an indication of the network event; and send the one or more network event messages to one or more customer systems for respective customer networks of the plurality of customer networks, wherein the one or more customer systems are affected by the network event.

19 Claims, 8 Drawing Sheets

EVENT-DRIVEN NOTIFICATION AND NETWORK SERVICE BUS FOR A CLOUD EXCHANGE

This application claims the benefit of U.S. Provisional Application No. 62/338,863 filed May 19, 2016, the entire content of which is incorporated by reference.

TECHNICAL FIELD

This disclosure relates to a cloud exchange and, more specifically, to a platform facilitating interconnections among cloud service customers and cloud service providers.

BACKGROUND

A co-location facility provider (a "provider") may employ a communication facility, such as a data center or warehouse, in which multiple customers of the provider locate network, server, and storage gear and interconnect to a variety of telecommunications, cloud, and other network service provider(s) with a minimum of cost and complexity. Such co-location facilities may be shared by the multiple customers. By using co-location facilities of the provider, customers of the provider including telecommunications providers, Internet Service Providers (ISPs), application service providers, service providers, content providers, and other providers, as well as enterprises, may enjoy less latency and the freedom to focus on their core business.

Customers co-located at a co-location facility typically lease space or storage capacity for a set duration. Assets at a co-location facility, such as cabinets, cages, and ports, may provide customers the leased space or storage capacity. Some assets leased by customers at a co-location facility may become unavailable for which corrective action is needed.

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively.

The term "cloud-based services" or, more simply, "cloud services" refers not only to services provided by a cloud, but also to a form of service provisioning in which cloud customers contract with cloud service providers for the online delivery of services provided by the cloud. Cloud service providers manage a public, private, or hybrid cloud to facilitate the online delivery of cloud services to one or more cloud customers.

In some cases, the co-location facility provides interconnection services by which customers of the provider may interconnect to one another over the co-location facility infrastructure or by which a customer of the provider may interconnect its spatially and/or geographically distributed customer networking equipment over the co-location facility infrastructure. The co-location facility may in such cases be referred to as an "interconnection facility." The facility provider may provide services accessible to co-located customers via an interconnection, such services including, for example, a cloud exchange, Internet access, an Internet exchange, "metro connect" for reaching other communication facilities within a metropolitan area, a cross-connect from one customer to another, and other interconnection services. An interconnection may in some cases span multiple logical network boundaries defined by networks deployed by multiple different customers of the provider co-located, in some respect, within the co-location facility and including enterprise, managed services provider, network service provider, cloud service provider, and service reseller customers, for instance. These various co-location facility customer networks, each of which may make up at least a portion of the interconnection, may employ heterogeneous network equipment and network management technologies and protocols.

SUMMARY

In general, this disclosure describes a network service bus (also described herein as a message channel unit) by which an interconnection platform for a cloud-based services exchange ("cloud exchange") publishes network event messages indicating corresponding network events determined for heterogeneous network assets and orchestration devices of a network data center. The network service bus may then deliver published network event messages to customer systems that are subscribed to the respective, corresponding network events, i.e., that have requested to receive network event messages that describe given network events. Though the examples are described herein with respect to a cloud exchange service offered by a co-location facility provider, the examples described herein may also be applicable to other interconnection services offered by a co-location facility provider.

As described herein, the interconnection platform in some examples provides cloud customers of the exchange, e.g., enterprises, network carriers, and SaaS customers, with secure, private, virtual connections ("virtual circuits") to multiple cloud service providers (CSPs). The multiple CSPs participate in the cloud exchange by virtue of their having at least one accessible port in the cloud exchange by which a customer can connect to the one or more cloud services offered by the CSPs, respectively. Private networks of any customer of the exchange provider are directly interconnected using cross-connects or virtual circuits to any other customer at a common point, thereby allowing direct exchange of network traffic between the networks of the customers. Cloud customers may include network carriers (or network service providers), enterprises, and other users of cloud services offered by one or more cloud service providers. When provider network devices providing the cloud exchange fail or otherwise indicate a network event, the interconnection platform leverages a network system bus to provide customers of the cloud exchange network with event messages that describe the network event, e.g., device or path failure, bandwidth threshold reached, etc., with respect to affected interconnection assets in the cloud exchange. The network service bus delivers the network event messages to customers of the exchange that subscribe to receive messages about the affected interconnection assets. As described further herein, the interconnection platform may generate the network event messages based on information in a subscriber infrastructure repository to provide, e.g., re-routing information through a secure delivery of network event messages to affected subscribers of the exchange provider network.

In some examples, a method comprises receiving, by an interconnection platform for configuring a plurality of interconnection assets of a network data center to interconnect customer systems of a plurality of customer systems co-located in the network data center, a network device report message indicating a network event of an interconnection asset of the plurality of interconnection assets. The method also comprises generating, by the interconnection platform in response to the network device report message, one or more network event messages based on the network event, wherein each of the network event messages includes an indication of the network event. The method further comprises sending, by the interconnection platform, the one or more network event messages to one or more customer systems for respective customer systems of the plurality of customer systems, wherein the one or more customer systems are affected by the network event.

In another example, a cloud exchange comprises an interconnection platform configured for execution by one or more management devices of the provider of a network data center to configure a plurality of interconnection assets of the network data center to interconnect customer systems of a plurality of customer systems co-located in the network data center, the interconnection platform comprising: a network event unit controller configured to: receive an indication of a network event of an interconnection asset of the plurality of interconnection assets; generate, in response to the network device report message, one or more network event messages based on the network event, wherein each of the network event messages includes an indication of the network event; and send the one or more network event messages to one or more customer systems for respective customer systems of the plurality of customer systems, wherein the one or more customer systems are affected by the network event.

In another example, a system comprises a network data center comprising a plurality of interconnection assets, the interconnection assets comprising a plurality of ports by which a customer system associated with a customer of a provider of the network data center. The system also comprises an interconnection platform configured to interconnect customer systems of a plurality of customer systems co-located in the network data center, the interconnection platform comprising: a network event unit controller, configured to: receive an indication of a network event of an interconnection asset of the plurality of interconnection assets; generate, in response to the network device report message, one or more network event messages based on the network event, wherein each of the network event messages includes an indication of the network event; and send the one or more network event messages to one or more customer systems for respective customer networks of the plurality of customer networks, wherein the one or more customer systems are affected by the network event. The system also comprises a rule repository for storing data usable for re-routing the one or more customer systems affected by the network event of the interconnection asset; a subscriber system repository for storing information on the one or more customer systems subscribed to receive network event messages from interconnection platform; and a message channel unit for sending the one or more network event messages to the one or more customer systems. The system further comprises a customer system configured to receive the network event messages, wherein the network event messages cause the customer system to redirect network traffic for an interconnection to an alternate one of the interconnection assets.

The details of one or more techniques of the disclosure are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1A:
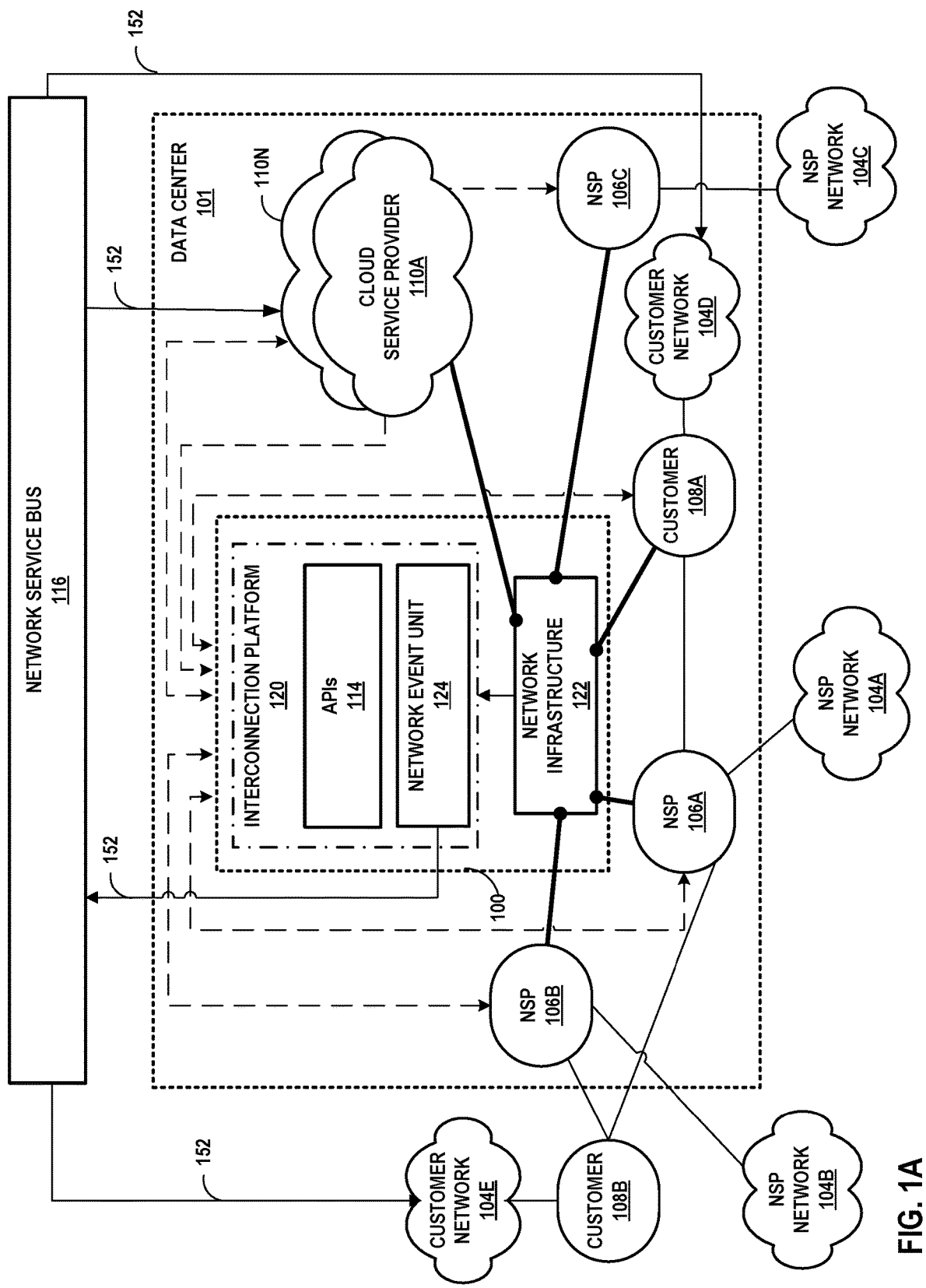
FIG. 1A is a block diagram that illustrates a high-level view of a data center that provides an operating environment for network event message generation and delivery for cloud-based services exchange, in accordance with the techniques described herein.

FIG. 1A is a block diagram that illustrates a high-level view of a data center 101 that provides an operating environment for network event message generation and delivery for cloud-based services exchange 100. Cloud-based services exchange 100 ("cloud exchange 100") allows a corresponding one of customer networks 104D, 104E and carrier networks 104A-104C (collectively, "private networks 104") of any carriers 106A-106C (collectively, "carriers 106") or other cloud customers including enterprise customers 108A, 108B to be directly interconnected, via a virtual layer 2 (L2) or layer 3 (L3) connection to any other customer network and/or to any of cloud service providers 110A-110N (collectively, "CSPs 110"), thereby allowing direct exchange of network traffic among the customer networks and CSPs 110. As used herein, a "cloud customer" refers to a consumer of cloud services provided by a cloud service provider, a "cloud provider" or "cloud service provider" refers to a provider of cloud services. A "customer" may refer to a cloud customer or more broadly to a customer of the facility provider that deploys the one or more network data centers that host the exchange. Customers of the facility provider may include cloud customers, carriers, and cloud service providers, or other companies that co-locate in the network data centers of the facility provider.

Carriers 106 may each represent a network service provider ("NSP") that is associated with a transit network by which network subscribers of the carrier 106 may access cloud services offered by CSPs 110 via the cloud exchange 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud-based services as are offered by the CSPs 110 via the cloud exchange 100.

In this way, cloud exchange 100 and its network infrastructure streamlines and simplifies the process of partnering CSPs 110 and customers (via carriers 106 or directly) in a transparent and neutral manner. One example application of cloud exchange 100 is a co-location and interconnection data center in which CSPs 110 and carriers 106 and/or customers 108 may already have network presence, such as by having one or more accessible ports available for interconnection within the data center. This allows the participating carriers, customers, and CSPs to have a wide range of interconnectivity options in the same facility. Cloud exchange 100 of data center 101 includes network infrastructure 122 that provides a L2/L3 switching fabric by which CSPs 110 and customers/carriers interconnect. Network infrastructure 122 may include network devices such as routers, switches, software-defined networking (SDN) controllers, network management systems, provisioning systems, or the like, to provide the interconnection of customers/carriers. This enables a carrier/customer to have options to create many-to-many interconnections with only a one-time hook up to the switch fabric and underlying interconnection platform 120 of cloud exchange 100. In other words, instead of having to establish separate connections across transit networks to access different cloud service providers or different cloud services of one or more cloud service providers, cloud exchange 100 allows customers to interconnect to multiple CSPs and cloud services using network infrastructure 122 within data center 101. The switching fabric of network infrastructure 122 may comprises an L3 autonomous system.

By being connected to and utilizing cloud exchange 100, customers can purchase services and reach out to many end users in many different geographical areas without incurring the same expenses typically associated with installing and maintaining multiple virtual connections with multiple CSPs 110. For example, carrier 106A can expand its services using network 104E of carrier 106B.

Cloud exchange 100 includes an interconnection platform 120 that exposes a collection of software interfaces, also referred to herein as application programming interfaces (APIs) 114 in that the APIs 114 define the methods, fields, and/or other software primitives by which applications may invoke the interconnection platform 120 to configure virtual connections the cloud exchange 100. The software interfaces allow carriers 106 and customers 108 programmatic access to capabilities and assets of the cloud exchange 100.

On the buyer side, the software interfaces presented by the underlying interconnection platform provide an extensible framework that allows software developers associated with the customers of cloud exchange 100 to create software applications that allow and leverage access to the interconnection platform 120 by which the applications may request that the cloud exchange 100 be configured with virtual circuit-based connectivity to cloud services offered by any of the CSPs 110. For example, these buyer-side software interfaces (or "buyer APIs" of APIs 114) may allow customer applications for NSPs and enterprise customers, e.g., to obtain authorization to access the cloud exchange, obtain information regarding available cloud services, obtain active ports and metro area details for the customer, create virtual circuits of varying bandwidth to access cloud services (including dynamic selection of bandwidth based on a purchased cloud service to create on-demand and need based virtual circuits to cloud service providers), delete virtual circuits, obtain active virtual circuit information, obtain details surrounding CSPs partnered with the cloud exchange provider, obtain customized analytics data, validate partner access to interconnection assets, and as further described herein, receive network event messages of network events of interconnection assets in the network infrastructure 122 of data center 101.

On the cloud provider (seller) side, the software interfaces may allow software developers associated with cloud providers to manage their cloud services and to enable customers to connect to their cloud services. For example, these seller-side software interfaces (or "seller APIs" of APIs 114) may allow cloud provider applications to obtain authorization to access the cloud exchange, obtain information regarding available cloud services, obtain active ports and metro area details for the provider, obtain active port details in a given data center for the provider, approve or reject virtual circuits of varying bandwidth to access cloud services created by customers, obtain virtual circuits pending addition and confirm addition of virtual circuits, obtain virtual circuits pending deletion and confirm deletion of virtual circuits, obtain customized analytics data, validate partner access to interconnection assets, and as further described herein, receive network event messages of network events of interconnection assets in the network infrastructure 122 of data center 101.

The APIs 114 facilitate machine-to-machine communication to enable dynamic provisioning of virtual circuits in the cloud exchange for interconnecting customer and provider networks. In this way, the interconnection platform 120 enables the automation of aspects of cloud services provisioning. For example, the software interfaces may provide an automated and seamless way for customers to establish, de-install and manage interconnection with multiple, different cloud providers participating in the cloud exchange.

In some examples, cloud exchange 100 includes an API gateway having one or more processors that executes one or more applications that expose software interfaces defined according to APIs 114. The applications may invoke services that correspond to endpoints of the APIs 114, and the services may themselves invoke the cloud exchange platform service of an orchestration engine. API gateway may execute on a management device such as one or virtual machines and/or real servers of data center 101. API gateway may comprise a cluster of one or more physical and/or virtual computing machines executing on one or more physical processors.

In some examples, cloud exchange 100 includes an orchestration engine that organizes, directs and integrates underlying software sub-systems for managing various aspects of interconnection within the network infrastructure 122 as well as cloud services management. The orchestration engine may, for example, provide a rule-drive workflow engine that operates between the APIs 114 and the underlying interconnect platform of cloud exchange 100 that includes sub-systems and network infrastructure 122. In this way, the orchestration engine can be used by customer-proprietary applications and the APIs 114 for direct participation with the interconnection platform 120 of the cloud exchange 100. In other words, the orchestration engine offers a "cloud exchange platform service" having various application engines or workflows to handle the API gateway service requests.

Sub-systems and orchestration engine may each be centralized or distributed applications and may execute on a management device such as one or virtual machines and/or real servers of data center 101.

Network infrastructure 122 represents the cloud exchange switching fabric and includes multiple ports that may be dynamically interconnected with virtual circuits by invoking APIs 114. Each of the ports is associated with one of carriers 106, customers 108, and CSPs 110. A virtual circuit may refer to, e.g., an Ethernet or other L2 connection such as a Layer 2 VPN or virtual private LAN (e.g., E-LINE, E-LAN, E-TREE, or E-Access), an Internet exchange-based interconnection in which respective routers of interconnected customers directly peer and exchange layer 3 routes for service traffic exchanged via the exchange 100, and a cloud exchange in which customer routers peer with exchange 100 (or "provider") routers rather than directly with other customers using a Layer 3 VPN.

Figure 1B:
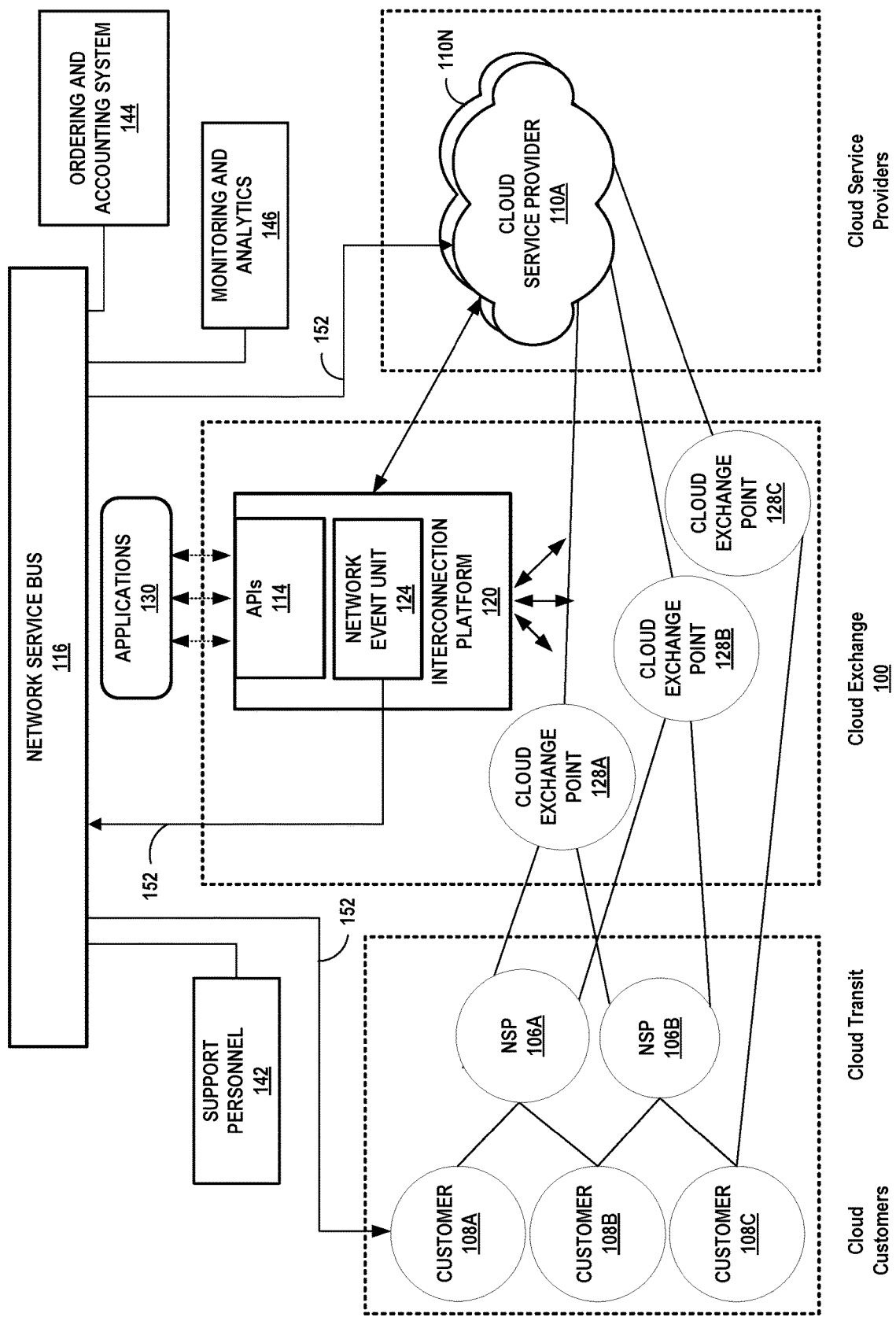
FIG. 1B is a block diagram that illustrates network event message configuration and delivery for cloud-based services exchange, in accordance with techniques described herein.

Although interconnection platform 120 is depicted in FIGS. 1A-1B and described above with respect to a particular architecture, interconnection platform 120 may execute at least in part according to different architectures.

For interconnections at layer 3 or above, customers 108 and carriers 106 may receive services directly via a layer 3 peering and physical connection to exchange 100 or indirectly via one of carriers 106. Carriers 106 provide "transit" by maintaining a physical presence within one or more of exchanges and aggregating layer 3 access from one or customers 108. Carriers 106 may peer, at layer 3, directly with one or more exchanges and in so doing offer indirect layer 3 connectivity and peering to one or more customers 108 by which customers 108 may obtain services from the exchange 100. Cloud exchange 100 may in some cases provide a Carrier Ethernet Exchange to enable aggregated layer 2 access by carriers 106 for enterprise customers 108.

Further example details of a cloud exchange can be found in U.S. patent application Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE;" and in U.S. patent application Ser. No. 15/001,766, filed Jan. 20, 2016 and entitled "MULTI-CLOUD, MULTI-SERVICE DATA MODEL;" each of which are incorporated herein by reference in their respective entireties.

According to the techniques described in this disclosure, interconnection platform 120 includes a network event unit 124 for generation of network event messages 152 associated with one or more network events of an interconnection asset (e.g., routers, switches, ports, etc.) of a network infrastructure 122 in data center 101. The network event messages 152 are delivered to subscriber systems (e.g., customer systems co-located in data center 101 by corresponding customers, cloud service providers, etc.) through a network service bus 116. As will be further described herein, network service bus 116 may be a message channel unit for generation and delivery of network event messages to subscriber customer systems. For example, a network event may occur when a router or switch of network infrastructure 122 of data center 101 becomes unavailable, e.g., due to maintenance or failure, which affects particular customer systems on the buyer and/or seller side. For example, a port failure network event may break a virtual circuit between a customer 108B and CSP 110A such that customer 108B is no longer able to receive cloud service traffic from CSP 110A via the virtual circuit. As another example, a bandwidth threshold reached network event may indicate that traffic transported on a virtual circuit may be throttled, dropped, or otherwise affected as a result of exceeding the bandwidth threshold.

Network event unit 124 may generate network event messages 152 based on the network event. As further described herein, network event unit 124 may generate network event messages 152 based on information from a subscriber infrastructure repository such that network event messages are delivered to subscriber systems in a secure manner with information on the network event and re-routing information. In general, the subscriber infrastructure repository includes information relating to re-routing rules for network events and identification of subscriber systems for customer networks interconnected via the interconnection assets of the data center. As further described below, information relating to the re-routing rules for network events may include rules to determine the alternate path and/or secondary device to re-route the network traffic. Information relating to the subscriber systems may include information to identify subscriber systems affected by the network event. By utilizing this information, network event messages may be generated by an interconnection platform and delivered via a network service bus to particular subscribed customer systems comprising heterogeneous software-defined networking (SDN) or software automation networks.

In response to detecting a network event, network event unit 124 generates and publishes network event messages 152 to the network service bus 116 for delivery to the subscriber systems to inform subscriber systems of the network event associated with one of the interconnection assets of a network infrastructure 122 in data center 101 and re-routing rules. In one example, network event messages 152 may include JavaScript Object Notation (JSON) messages that are generated in a data-interchange format such that additional filtering and/or processing logic may be applied before delivery to subscriber systems. In another example, network event messages 152 may include data formatted according to eXtensible Markup Language (XML) or JSON to describe a network event and/or to describe an ameliorative action to be taken by a customer system to handle the network event.

Network service bus 116 may deliver the network event messages 152 from the network event unit 124 to affected subscriber systems of the exchange. In some examples, the network event messages 152 may be made available to buyers such as enterprise customers 108 and carriers 106, sellers such as CSPs 110, or both buyers and sellers of cloud services. In this way, a subscriber system that requests cloud exchange services via cloud exchange 100 does not need to poll the network infrastructure 122 of data center 101 to obtain network events, and may be notified of the network event occurring in the network infrastructure 122 and re-routing rules to which the subscribed customer system is to be re-routed. The techniques may reduce the computing resource and network load on both the customer systems and on the interconnection platform. In addition, the techniques may improve customer system responsiveness to network events.

FIG. 1B is a block diagram that illustrates network event configuration and delivery for cloud-based services exchange 100, in accordance with some example implementations described herein. In this example architecture, cloud exchange 100 includes multiple cloud exchange points 128A-128C (also described as "cloud exchange points" and collectively referred to as "cloud exchange points 128"), which may represent geographically distributed data centers (e.g., data centers 101 in FIG. 1A) within a metropolitan area ("metro-based," e.g., in New York City, N.Y.; Silicon Valley, Calif.; Seattle-Tacoma, Wash.; Minneapolis-St. Paul, Minn.; London, UK; etc.), and in which cloud exchange 100 may directly or indirectly (via NSPs 106) interconnect cloud services providers 110 with cloud customers 108 accessing cloud services. The cloud exchange 100 may interoperate with a network service bus 116 to deliver network event messages 152 to subscriber systems such as cloud customers 108 and cloud service providers 110. In various examples, cloud exchange 100 may include more or fewer cloud exchange points 128. In some instances, a cloud exchange 100 includes just one cloud exchange point 128. As used herein, reference to a "cloud exchange" or "cloud-based services exchange" may refer to a cloud exchange point. A cloud exchange provider may deploy instances of cloud exchanges 100 in multiple different metropolitan areas, each instance of cloud exchange 100 having one or more cloud exchange points 128.

Applications 130 developed and deployed by CSPs 110, NSPs 106, and customers 108 invoke APIs 114 of interconnection platform 120 to, for example, automatically control provisioning and manage aspects of cloud exchange 100 for aspects of interconnection with one or more cloud providers/customers, including: (1) provisioning of interconnects, (2) identification and authorization of carriers, (3) management and fulfillment of orders, (4) delivery of network services, (5) managing inventory and capacity, (6) managing and reporting/alerting incidents, and (7) content management.

In the illustrated example, each of cloud exchange points 128 includes network infrastructure 122 and an operating environment by which subscriber systems such as cloud customers 108A-108D (collectively, "cloud customers 108") receive cloud services from multiple cloud service providers 110A-110N (collectively, "cloud service providers 110"). Cloud customers 108 may receive cloud services directly via a layer 3 peering and physical connection to one of cloud exchange points 128 or indirectly via one of network service providers 106A-106B (collectively, "NSPs 106," or alternatively, "carriers 106"). NSPs 106 provide "cloud transit" by maintaining a physical presence within one or more of cloud exchange points 128 and aggregating layer 3 access from one or customers 108. NSPs 106 may peer, at layer 3, directly with one or more cloud exchange points 128 and in so doing offer indirect layer 3 connectivity and peering to one or more customers 108 by which customers 108 may obtain cloud services from the cloud exchange 100.

Each of cloud exchange points 128, in the example of FIG. 1B, may be assigned a different autonomous system number (ASN). For example, cloud exchange point 128A may be assigned ASN 1, cloud exchange point 128B may be assigned ASN 2, and so forth. Each cloud exchange point 128 is thus a next hop in a path vector routing protocol (e.g., BGP) path from cloud service providers 110 to customers 108. As a result, each cloud exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, cloud exchange points 128 may internalize the eBGP peering relationships that cloud service providers 110 and customers 108 would maintain on a pair-wise basis. Instead, a customer 108 may configure a single eBGP peering relationship with a cloud exchange point 128 and receive, via the cloud exchange, multiple cloud services from one or more cloud service providers 110. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol.

Customer 108C is illustrated as having contracted with the cloud exchange provider for cloud exchange 100 to directly access layer 3 cloud services via cloud exchange point 128C and also to have contracted with NSP 106B to access layer 3 cloud services via a transit network of the NSP 106B. Customer 108B is illustrated as having contracted with multiple NSPs 106A, 106B to have redundant cloud access to cloud exchange points 128A, 128B via respective transit networks of the NSPs 106A, 106B. The contracts described above are instantiated in network infrastructure of the cloud exchange points 128 by L3 peering configurations within switching devices of NSPs 106 and cloud exchange points 128 and L3 connections, e.g., layer 3 virtual circuits, established within cloud exchange points 128 to interconnect cloud service provider 110 networks to NSPs 106 networks and customer 108 networks, all having at least one port offering connectivity within one or more of the cloud exchange points 128.

For layer 3 cloud services, a virtual circuit may represent a layer 3 path through an IP/MPLS fabric of one or more of cloud exchange points 128, between an attachment circuit connecting a customer network to the cloud exchange point and an attachment circuit connecting a cloud service provider network to the cloud exchange point. Each virtual circuit may include at least one tunnel (e.g., an LSP and/or Generic Route Encapsulation (GRE) tunnel) having endpoints at the provider edge/autonomous system boundary of the cloud exchange point.

Cloud exchange points 128 may be configured with multiple layer 3 virtual circuits to interconnect customer/NSP networks and cloud service provider networks with end-to-end IP paths. Cloud exchange points 128 may be configured with multiple layer 2 virtual circuits to interconnect customer/NSP networks and cloud service provider networks with layer 2 connectivity. Each of cloud service providers and customers/NSPs may be an endpoint for multiple virtual circuits, with multiple virtual circuits traversing one or more cloud exchange points 128 to connect the endpoints.

In accordance with the techniques of this disclosure, network event unit 124 of cloud exchange 100 may generate network event messages 152 based on network events occurring in cloud exchange 100, and deliver, via a network service bus 116, to various subscriber systems including cloud customers ("buyers") such as enterprise customers 108 and carriers 106, cloud service providers ("sellers") such as CSPs 110, support personnel or operator 142 that may include cloud exchange support personnel and/or customer support personnel or operator, ordering and accounting systems 144 that manage subscriber purchases, and/or monitoring and analytics 146 that manage usage of interconnection assets of a network infrastructure 122. Subscriber systems may also include any system or personnel that may monitor or operate network devices within the cloud exchange. In this way, network event messages associated with network events may be delivered to target subscribers via the network service bus 116.

In operation, network event unit 124 may collect and track network events occurring in the cloud exchange points 128. For instance, an interconnection asset of a data center, e.g., router or switch, that routes traffic in the cloud exchange points 128 (e.g., data center) may fail. Network event unit 124 may collect information on the interconnection asset affected by network events such as unavailability due to maintenance or failure, exceeding network bandwidth thresholds, or other network events relating to the device or traffic flow.

In response to receiving the network event, the network event unit 124 generates a network event message 152 based on information associated with subscriber systems and network event rules. This information may be stored in a repository such as a subscriber infrastructure repository. As described further below, the subscriber infrastructure repository may include information on an alternate path or secondary device to which the network traffic is re-routed, and information on the affected subscriber systems. For example, customer 108A may interconnect with cloud service provider 110A through cloud exchange point 128A. When a network event occurs in cloud exchange point 128A, network event unit 124 receives a notification describing the network event. Network event unit 124 may refer to one or more repositories to identify the affected subscriber systems, e.g., customer 108A and/or cloud service provider 110A, and generate a network event message 152 to be delivered to customer 108A and/or cloud service provider 110A. In another example, customer 108C may interconnect with cloud service provider 110A through cloud exchange point 128C. When a network event occurs in cloud exchange point 128C, network event unit 124 receives a notification describing the network event. Network event unit 124 may refer to one or more repositories to identify the affected subscriber system, e.g., customer 108C and/or cloud service provider 110A, to generate a network event message 152 to be delivered to customer 108C and/or cloud service provider 110A.

As further described herein, network event unit 124 may also generate and deliver network event messages 152 to provide details of the network event and/or re-routing rules such as alternate path and/or secondary devices of the failed network device to which the network traffic is to be re-routed. In this way, network event unit 124 provides event-driven notification and/or alternate paths for subscriber customer systems affected by network events.

Network event unit 124 may publish the generated network event message 152 to network service bus 116 such that the network service bus 116 may deliver network event messages 152 to the affected subscriber system, e.g., customer 108 and/or cloud service provider 110. The network service bus 116 may deliver network event messages 152 that include device and/or port details of the network device that generated the network event and, in some cases, new device and/or port details to which the traffic is to be routed. In response to receiving the network event message 152 from the network service bus 116, customers 108 and/or cloud service providers 110 may, via software-defined networking (SDN) listeners (e.g., application program interface (API) or java message service (JMS) message listeners, etc.) work with SDN controllers (e.g., network event unit 124) to re-route traffic suggested in the network event message 152. For example, affected customers 108 may order a different port, virtual circuit, or another virtual large area network (VLAN) within a port as suggested by the network event message in response to receiving the network event messages 152.

In other examples, the network event message 152 may be a notification that network devices of the cloud exchange have already been re-routed. In another example, network service bus 116 may notify support personnel 142, e.g., a cloud exchange provider support personnel and/or customer support personnel or operator, or the network event. For example, a notification message such as an email, pager, message, and/or automated voice call may be pushed to the support personnel to notify the support personnel 142 of a network event and re-routing rules, and/or that the subscriber system has already been re-routed. Network service bus 116 may also deliver notifications to other subscribers including ordering and accounting systems 144, monitoring and analytics systems 146, or other systems or personnel monitoring the network events occurring within the cloud exchange. As one example, the network event unit 124 may send network statistics to network service bus 116 for delivery to the monitoring and analytics system 146 such that the network statistics may be used for network capacity management, network bandwidth forecasting, and/or customer sales. As another example, network event unit 124 may send network event messages to notify ordering and accounting systems 144 that network bandwidth thresholds have been exceeded such that sellers may accurately bill the buyers.

Network event messages 152 may be delivered in various channels, including public and/or secure channels. The channels in which to deliver the network event messages 152 are determined by the network event unit 124 from information in the subscriber infrastructure repository. In further examples, network event unit 124 may generate specific network event messages 152 for particular subscribers based on rules in the subscriber infrastructure repository.

Figure 2:
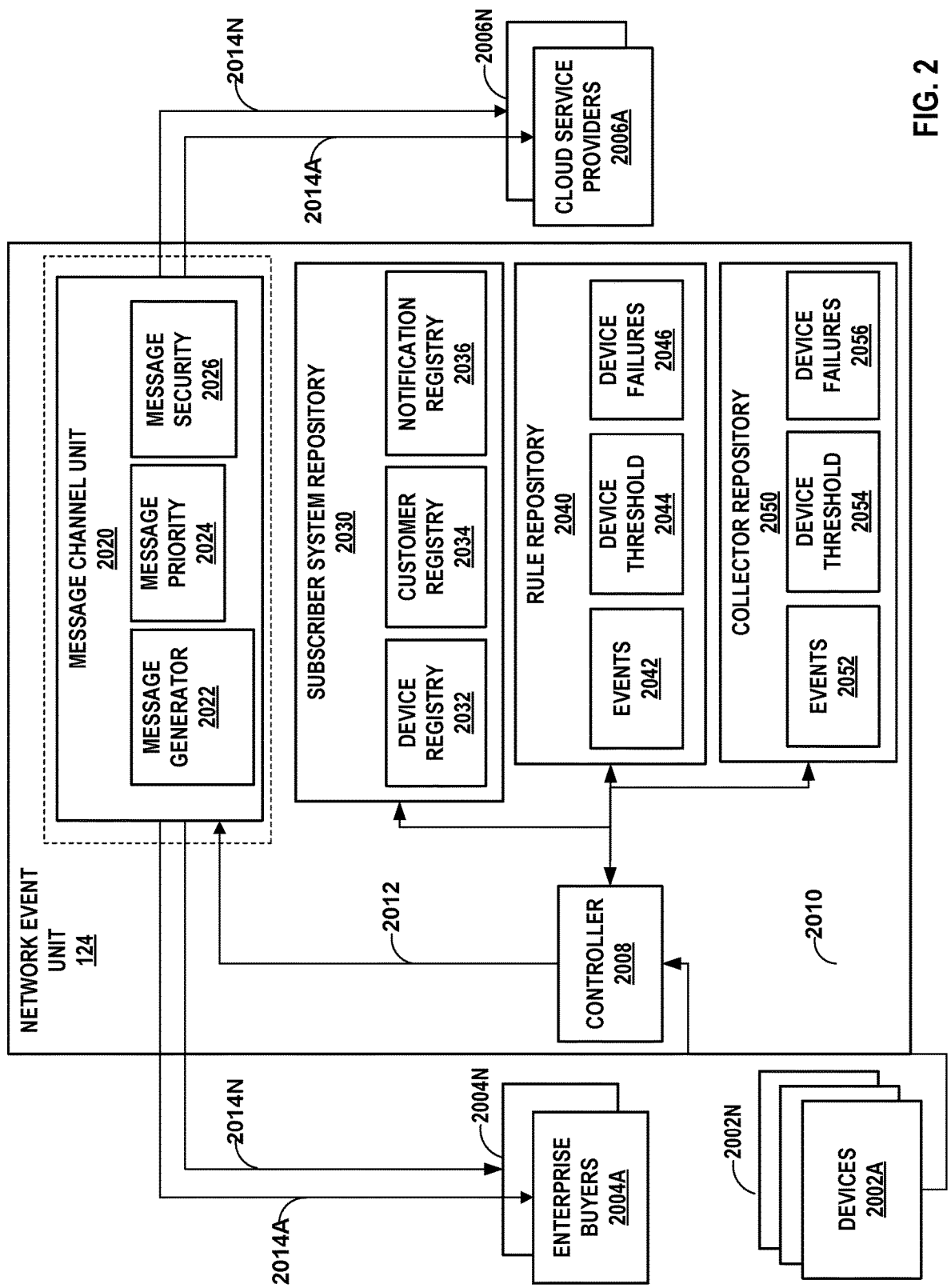
FIG. 2 is a block diagram that illustrates details of an example architecture for a network event unit of a cloud exchange according to techniques described herein.

FIG. 2 is a block diagram illustrating, in further detail, an example network event unit 124 according to techniques described herein. Network event unit 124 may represent an example instance of any of network event unit 124 of cloud exchanges 100 of FIGS. 1A-1B. Network event unit 124 may include a controller 2008, a subscriber system repository 2030, a rule repository 2040, a collector repository 2050, and a message channel unit 2020. Message channel unit 2020 may represent/implement aspects of network service bus 116 of FIGS. 1A-1B, for example.

The controller 2008 may collect network events of network devices 2002A-2002N (collectively, "network devices 2002") in the cloud exchange such as network device failures, maintenance requests, network bandwidth threshold breaches, network statistics, network bandwidth consumption, and network packet loss. Network devices may include routers, switches, software-defined networking (SDN) controllers that control one or more other network devices, network management systems, provisioning systems, or the like, to provide the interconnection of customers/carriers. Devices 2002 may be located throughout a data center, including in multiple different customer cages (or co-location spaces) for corresponding customers of the provider. For example, devices 2002 may include multiple different SDN controllers for respective customer networks located in respective customer cages. SDN controllers of devices 2002 may report network events using a variety of different network device reporting protocols, resulting in a heterogeneous network device event reporting environment.

Controller 2008 may receive, from network devices 2002, network device report messages 2010 indicating network events in accordance with an SDN protocol or other network device reporting protocol, such as Netconf, Simple Network Management Protocol (SNMP), OpenFlow, NetFlow, or IP-FIX. Controller 2008 may execute such network device reporting protocols according to the network devices 2002 that output network device report messages 2010 that conform to any of the network device reporting protocols. In some examples, controller 2008 includes an SDN controller.

In response to receiving a network device report message 2010 indicating a network event from one of network devices 2002, controller 2008 generates one or more payload publication messages 2012 based on the received network device report message 2010 and subscriber infrastructure information in a repository. For example, the repository may include a subscriber system repository 2030, a rule repository 2040, and/or a collector repository 2050.

In particular, collector repository 2050 may include registries to store events 2052, device thresholds 2054, and/or device failures 2056. For example, when a network device report message 2010 of a network event is received from network devices 2002, controller 2008 may store details of the network event based on events 2052 (e.g., alerts and/or maintenance requests), device threshold 2054, and/or device failures 2056. Collector repository 2050 may represent a database, a table, or other data structure stored to a storage device. In one instance, a router in the cloud exchange may receive a maintenance request to initiate planned device maintenance such that the router becomes unavailable and a second router is enabled. Controller 2008 may store device information relating to the maintenance request, such as the device type, device identification, device name, and/or network event type (e.g., maintenance request) in an events 2052 registry. Similarly, network bandwidth for a router in the cloud exchange may exceed defined network bandwidth thresholds and send a network event to controller 2008. Controller 2008 may store device information relating to the network threshold breach, such as device type, device identification, device name, threshold type, threshold configured limit, threshold breach value, and/or unit of measure in device thresholds 2054 registry. As another example, a network event may occur for a device failure of a router in the cloud exchange. Controller 2008 may determine from the network event which router has failed and may store information about the network failure, such as the device type, device identification, device name, and/or network event type (e.g., device failure) in a device failures 2056 registry.

In response to receiving a network device report message 2010, controller 2008 of network event unit 124 may refer to rule repository 2040 to determine re-routing rules corresponding to the network event. Rule repository 2040 may include events 2042, device threshold 2044, and device failures 2046 registries. In one example, when controller 2008 receives a network device report message 2010 for a maintenance request, controller 2008 may refer to events 2042 registry to determine the re-routing rules corresponding to the maintenance request. For instance, the events 2042 registry may include information of an alternate device such as alternate path, alternate device type, alternate device identification, and alternate device name. In another example, when controller 2008 receives a network device report message 2010 for a network bandwidth breach, controller 2008 refers to the device threshold 2044 registry to determine the re-routing rules corresponding to the network bandwidth threshold breach. For instance, the device thresholds 2044 registry may include information of an alternate device used to balance the load such as alternate device type, alternate device identification, alternate device name, alert code, and alert description. In another example, when controller 2008 receives a network device report message 2010 for a device failure, controller 2008 may refer to device failures 2046 registry to determine the re-routing rules corresponding to the network or device failure. For instance, the device failures 2046 registry may include information on the error code, error message, alternate path, alternate device type, alternate device identification, and alternate device name.

Controller 2008 of network event unit 124 may also refer to subscriber system repository 2030 to determine whether subscriber customer systems are interconnected with the affected network device. For example, the subscriber system repository 2030 may include a device registry 2032, a customer registry 2034, and a notification registry 2036. The device registry 2032 may include information on devices that are interconnected with one of the network devices 2002 that is associated with the network event. For example, a customer router may be interconnected with a failed router in the cloud exchange. Controller 2008 may refer to device registry 2032 to determine the associated customer routers, and more particularly in some cases, software-defined networking (SDN) listeners, interconnected with the failed network device in the cloud exchange. Similarly, customer registry 2034 may include information on the affected customer, such as whether the affected customer is an enterprise buyer or a cloud service provider. Controller 2008 may also refer to notification registry 2036 to determine the type of notification the customer system is subscribed to receive. For example, the notification type may include electronic mail, a textual message, a numeric message, and/or an audio message. Notifications may also include re-routing instructions or a notification that re-routing has been configured.

Controller 2008 may use the information from the rule repository 2040 and subscriber system repository 2030 to generate network event messages such as one or more payload publication messages 2012. Payload publication messages 2012 may be JavaScript Object Notation (JSON), eXtensible Markup Language, or other structured data objects that include information on the network event, the affected customer system, and/or information on one or more alternate paths and/or devices to re-route the network traffic. Payload publication messages 2012 may be human-readable. The following are examples of payload publication messages 2012:

Example payload for network device failure:
Failure: {
device_type: "port" // or slot, module, switch, etc.
device_id: "1234",
device_name: "SV1-CVP1-PORT-1G",
error: {
error_code: "err01"
error_msg: "Unexpected Device, failure"
}
alternate_path: {
device_type: "port" // or slot, module, switch, etc.
device_id: "6789",
device_name: "SV1-CVP2-PORT-1G"
}
}

Example payload for maintenance request:
maintenance: {
device_type: "port" // or slot, module, switch, etc.
device_id: "1234",
device_name: "SV1-CVP1-PORT-1G",

```
window: {
msg_code: "maint01",
msg_desc: "Under maintenance",
start_time: "04/12/2016 1:00 PM PDT",
end_time: "04/12/2016 3:00 PM PDT"
}
alternate_path: {
device_type: "port" // or slot, module, switch, etc.
device_id: "6789",
device_name: "SV1-CVP2-PORT-1G"
}
}
```

Example payload for exceeding threshold:
```
threshold: {
type: "bandwidth",
configured limit: "85",
breached: "88.5",
unit: "%",
device_type: "port" // or slot, module, switch, etc.
device_id: "1234",
device_name: "SV1-CVP1-PORT-1G",
alert: {
code: "alert01",
desc: "Threshold limit is breached"
}
}
```

Controller 2008 may store information from the generated payload publication message 2012 in collector repository 2050. For example, collector repository 2050 may include events registry 2052, device threshold registry 2054, and device failures registry 2056. In one example, when controller 2008 generates a payload publication message 2012 for a network event such as a maintenance request, controller 2008 may store in events registry 2052 information about the maintenance request. For instance, the events registry 2052 may store information about the device scheduled for maintenance, duration of maintenance, and/or alternate path. Information on the device schedule for maintenance may include type of device performing maintenance (e.g., port, slot, module, switch, etc.), the device identification, and device name. Information on the duration of maintenance may include message code, message description, and maintenance start and end times. Information on the alternate path may include alternate device type (e.g., port, slot, module, switch, etc.), alternate device identification, and alternate device name. In another example, when controller 2008 generates a payload publication message 2012 for a threshold breach, controller 2008 may store in device threshold registry 2054 information relating to the threshold breach and the alert. For example, information relating to the threshold breach may include threshold type, threshold configured limit, threshold breach value, threshold unit of measure, type of device that breached the threshold, device identification, and device name. Information on the alert may include an alert code and alert description.

Controller 2008 may also store information on an alternate path that is recommended load balance the traffic, such as alternate device type, alternate device identification, and alternate device name. In another example, when controller 2008 generates a payload publication message 2012 for a device (e.g., router or switch) failure, controller 2008 may store in device failures registry 2056 information about the failed device, error, and/or alternate path. Information on the failed device may include failed device type (e.g., port, slot, module, switch, etc.), device identification, and device name. Information on the error may include error code and error message. Information on the alternate path may include an alternate device type (e.g., port, slot, module, switch, etc.), alternate device identification, and/or alternate device name.

Controller 2008 may use message channel unit 2020 to generate one or more network event messages 2014 to publish an indication of a payload received in a payload publication message 2012 to one or more subscriber systems subscribed to the underlying network event represented by (or network asset identified in) the payload, as such subscriptions are indicated in subscriber system repository 2030. Controller 2008 may use message channel unit 2020 to generate each network event message 2014 for output to a particular subscriber system in a format that can be understood by the particular subscriber system. For example, various SDN controllers may be configured to receive Java Messaging Service (JMS) messages, OpenFlow messages, NetConf messages, Hypertext Transfer Protocol (HTTP) messages for a RESTful Application Programming Interface (API), and take ameliorative or other action in response to such messages. Accordingly, in response to a particular payload publication message 2012, controller 2008 may use message channel unit 2020 to generate a JMS-formatted network event message 2014A for an SDN controller of enterprise buyer 2004A while generating an HTTP-formatted network event message 2014A for an API of an SDN controller of CSP 2006A. Controller 2008 may transform, e.g., using an XLST stylesheet, a payload publication message 2012 into an appropriate format for each network event message 2014. Controller 2008 outputs network event messages 2014 to the corresponding destination customer systems.

Controller 2008 may use message channel unit 2020 may generate each network event message 2014 to include a message identifier that corresponds to a private channel for the destination customer system. Message identifiers may include a message header, a message priority, and/or a message security. Message generator 2022 may receive payload publication message 2012 from controller 2008 and generate, for a customer system, an Application Programming Interface (API) or Java Message Service (JMS) message, e.g., that may be understood by the customer system SDN listener for the secure, private message channel for that customer. Message headers may include a Hypertext Transfer Protocol (HTTP) header, a Java Messaging Service (JMS) header, or other header for messages sent to, e.g., a SDN listener of a subscriber customer system.

Controller 2008 may use message channel unit 2020 to include a message priority 2024 field to indicate whether a network event message 2014 for publishing a payload publication message 2012 is a priority. For example, a network switch failure may render the cloud exchange inoperable. Controller 2008 may indicate, with a payload publication message 2012, that the network failure requires prioritized attention. In response to the priority indication, message channel unit 2020 may include an indication of the priority in published network event messages 2014 for the payload publication message 2012.

Message security 2026 may include a security field such that the payload publication message 2012 is associated with particular subscriber customer systems. As described above, a lookup of subscriber system repository 2030 may determine particular subscriber customer systems affected by the network event. Controller 2008 may include a security field in network event messages 2014 such that the messages are delivered to respective subscriber customer systems. For example, controller 2008 may receive a network device report message 2010 that a threshold was exceeded, controller 2008 may determine from the subscriber system repository 2030 that cloud service provider 2006A was affected by the threshold breach. Controller 2008 may generate a payload publication message 2012 recommending an alternate device to balance the traffic load. Message channel unit 2020 may include a message security 2026 field to the payload publication message 2012 such that network event message 2014B is specifically delivered to cloud service provider 2006A.

The message channel unit 2020 sends network event messages 2014, including indications of payload publication messages 2012, to subscriber customer systems such as enterprise buyers 2004A-2004N (collectively, "enterprise buyers 2004") and/or cloud service providers 2006A-2006N (collectively, "cloud service providers 2006"). As described above, message channel unit 2020 may also send the network event messages 2014 to support personnel, monitoring and analytics systems, and/or ordering and accounting systems.

A SDN controller of a subscriber customer systems may receive a network event message 2014 that includes an indication of a payload publication message 2012, which the subscriber customer system may use to reconfigure the subscriber customer system to handle the underlying network event. In this respect, the SDN controller operates as a listener for network event messages 2014 and may include an API message listener and/or a JMS message listener, for instance.

SDN listeners of customer systems may re-route the traffic according to an alternate path or other re-routing indication received in the network event message 2014. As one example, network device 2002A may be a router that has failed. Controller 2008 of network event unit 124 may receive a network device report message 2010 notifying of the failure in router device 2002A. Controller 2008 may refer to subscriber system repository 2030 and rule repository 2040 to determine the re-routing rules corresponding to the router failure and subscriber customer systems interconnected to the failed router, respectively. For instance, controller 2008 may determine from device failures 2046 registry in rule repository 2040 that the network device report message 2010 is a router failure. Controller 2008 may also determine from device customer registry 2034 that service traffic for enterprise buyer 2004A traverses router device 2002A and may determine from device registry 2032 that service traffic for enterprise buyer 2004A may be re-routed to device 2002N that is still in operation. Controller 2008 may also determine from notification registry 2036 that enterprise buyer 2004A is subscribed to receive electronic mail messages of the router failure.

Controller 2008 may generate a payload publication message 2012 including information on the failed router, the affected customer system (e.g., enterprise buyer 2004A), and/or information on one or more alternate path and/or secondary device to re-route the network traffic (e.g., another one of devices 2002N). Controller 2008 may determine that SDN listener of enterprise buyer 2004A may be configured to listen for HTTP messages. Controller 2008 may therefore include a HTTP header when publishing payload publication message 2012 to the SDN listener in a network event message 2014. Controller 2008 may also include a message priority 2024 field to indicate payload publication message 2012 is a high priority. Because subscriber customer systems may have heterogeneous SDN listeners, controller 2008 may include a message security 2026 field to associate the payload publication message 2012 to enterprise buyer 2004A. In this way, network event unit 124 may automatically provide respective subscriber customer systems one or more messages with suggestions for alternate paths and/or secondary devices to re-route the network traffic based on network events. Besides re-routing traffic to different network devices, a network event message may suggest alternate ports among other network infrastructure assets.

Figure 3:
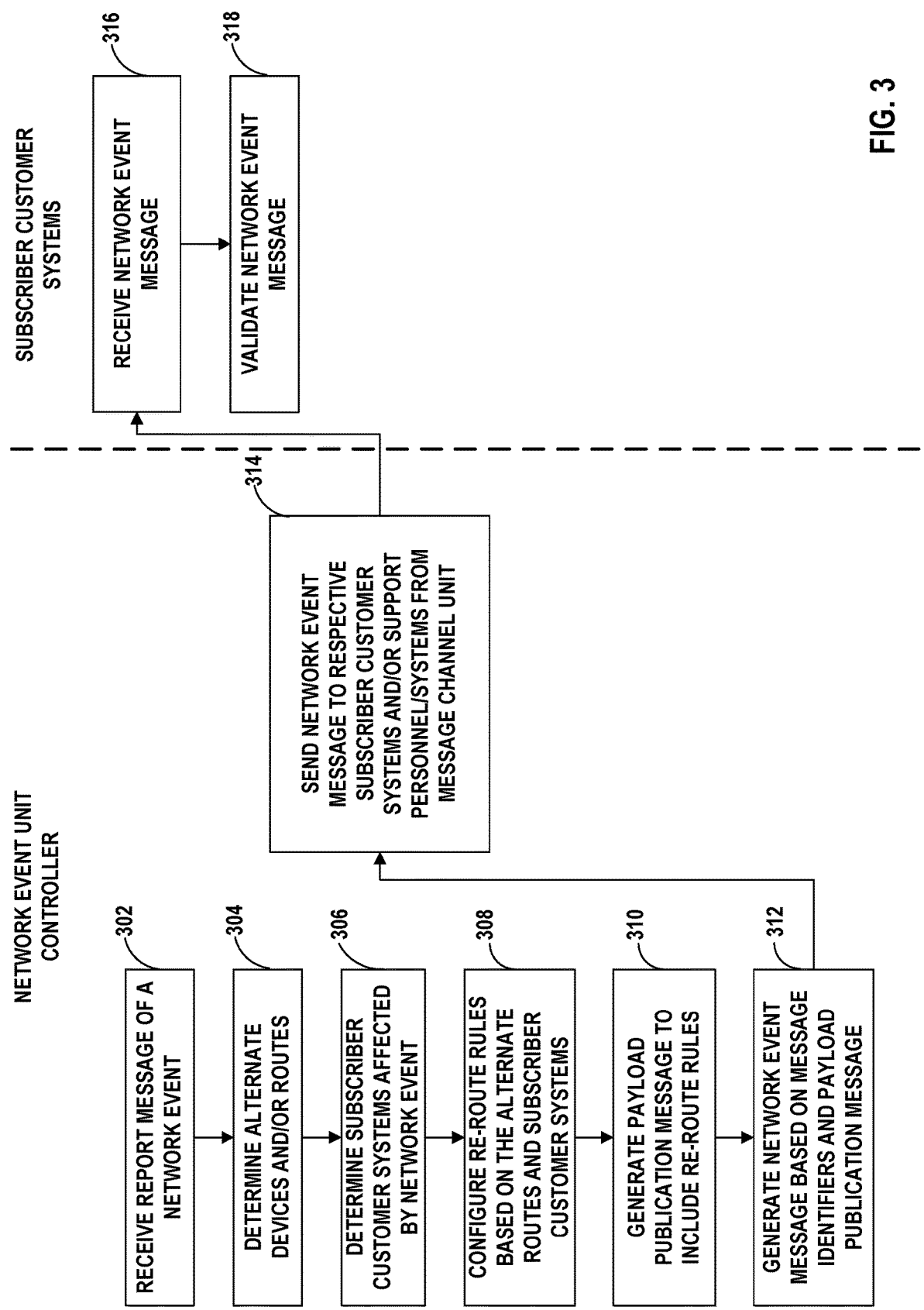
FIG. 3 is an example flowchart of generation and delivery of payload publication messages associated with one or more network events of interconnection assets of a network data center for delivery by a network service bus to subscriber systems, in accordance with techniques of this disclosure.

FIG. 3 is an example flowchart of a method for generation of payload publication messages associated with one or more network events of interconnection assets of a network data center and delivery by a message channel unit to respective subscriber customer systems. In one example, network event unit controller may receive one or more report messages of network events of an interconnection asset, such as a switch port or a switch, in a data center of a cloud exchange (302). The network event unit controller may be a SDN controller configured to receive report messages as a JavaScript Object Notation ("JSON") object or an eXtensible Markup Language object. Report messages may include information on network events such as network device failures, maintenance requests, network bandwidth threshold breaches, network statistics, network bandwidth consumption, and network packet loss.

The network event unit controller may then determine alternate devices and/or routes to resolve the network event via information stored in the rule repository (304). To avoid disruption of the cloud service, the network event unit controller may determine from the rule repository alternate corrective routes for subscriber customer systems affected by the network event. For example, the controller may determine from a rule repository alternative route details including alternate device type, alternate device identification, and alternate device name.

The network event unit controller may also determine subscriber customer systems affected by the network event (306). For example, the controller may determine from a subscriber system repository the subscriber customer systems affected by the network event. In particular, the controller of network event unit may determine, for example, particular customer devices (e.g., routers, switches, SDNs, etc.), customers (e.g., enterprise buyers, cloud service providers, etc.), and notification types for subscriber systems affected by the network event. As one example, the controller may receive an indication of a switch failure network event, bandwidth threshold reached network event, or other network event for a switch of the cloud exchange network infrastructure. The controller may determine that an interconnection for a customer traverses the switch indicated as having the network event. The interconnection may no longer be operative and affect the ability of the customer to use the interconnection. As such, the customer is affected by the network event. As another example, the controller may receive an indication of a port failure network event for a port interconnection asset of the cloud exchange network infrastructure that is "owned" by a customer, in that the port is dedicated for exchanging traffic with a customer network for the customer that is co-located in the exchange. Because the failed port is owned and usable by the customer to access the cloud exchange, the customer network is no longer able to access the cloud exchange via the port and is in this way affected by the port failure network event. The controller may further determine the notification type, e.g., electronic mail, a textual message, a numeric message, and/or an audio message, to notify the subscriber customer system of the network event.

Network event unit controller may configure re-routing rules based on the subscriber system information and the alternate path information (308). Re-routing rules provide affected subscriber customer systems information on device or port details of the unavailable network device and also the alternative device or port details to which the traffic is re-routed. The network event unit controller may generate payload publication messages based on the network event, re-routing rules, and subscriber information (310). Network event unit controller may further store the details of the payload publication messages in a collector repository.

Network event unit controller sends the generated payload publication message to a message channel unit for appending message identifiers to the payload publication message and delivery to affected subscriber customer systems, support personnel, and/or support systems. Network event unit controller may append message identifiers to the payload publication messages (312), including message headers, message priorities and/or message securities. For example, network event unit controller may append headers including Hypertext Transfer Protocol (HTTP) header field, a Java Messaging Service (JMS) header field, or Application Programming Interface (API) header field such that SDN listeners of subscriber customer systems may identify payload publication messages. The controller may further append message securities to define restrictions of the payload publication message such that respective subscriber customer systems may receive the payload publication message.

The message channel unit may deliver the generated payload publication messages and appended message identifiers to respective subscriber customer systems affected by the network event, such as enterprise buyers, cloud service providers, support personnel, including cloud exchange provider support personnel or customer support personnel or operator, and/or to support systems, including monitoring and analytics systems or ordering and accounting systems (314). Respective subscriber customer systems may receive the payload publication messages, which provide affected subscriber customer systems with re-routing details that enable software-defined (SDN) listeners of respective subscriber customer systems to work with SDN controllers of a network data center to re-route traffic suggested in the payload publication message (316).

Once subscriber system receives the payload publication message, the subscriber customer system validates the payload publication message for the publisher of the payload publication message and the re-routing rules (318). In this way, the method may automate the delivery of re-routing rules to customer systems that are specifically affected by particular network events.

Figure 4A:
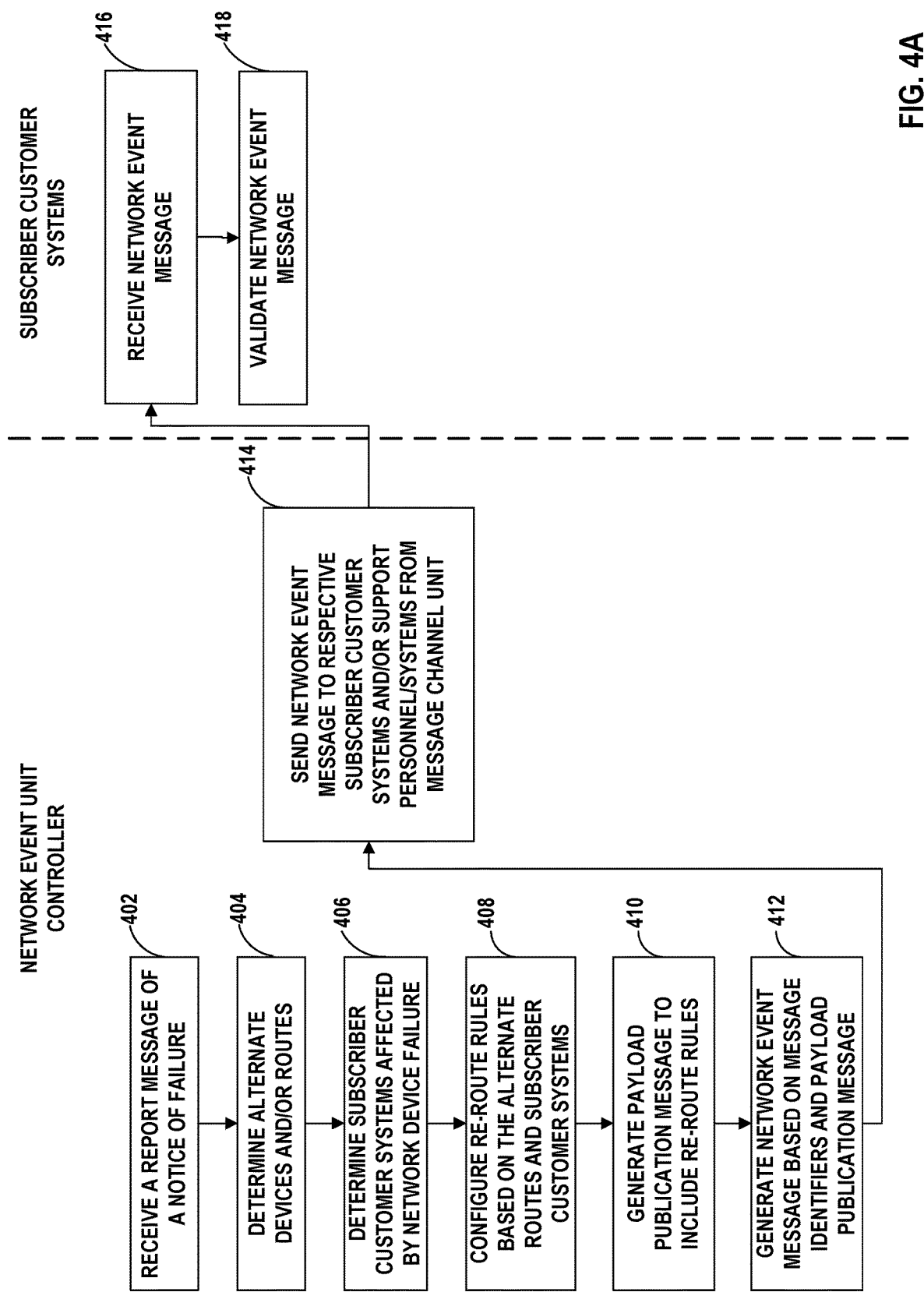
FIG. 4A is an example flowchart of a generation and delivery of payload publication messages for network failures in accordance with the techniques in this disclosure.

FIG. 4A is an example flowchart of a generation and delivery of network event messages for network device failures in accordance with the techniques in this disclosure. For example, network event unit controller receives a network device report message notifying of network device failures (402). For example, a failure may occur at a switch or router in the cloud exchange. The network event unit controller may be a SDN controller configured to receive report messages as a JavaScript Object Notation ("JSON") object or an eXtensible Markup Language object. In one example, network event unit controller may receive one or more network device report messages of network device failures, such as a switch port or a switch failure, in a data center of a cloud exchange.

Network event unit controller may then determine alternate devices and/or routes corresponding to a network device failure via information stored in the rule repository (404). Network event unit controller may determine from the rule repository alternate corrective routes (e.g., details of alternate device or port to which traffic is re-routed) for subscriber customer systems affected by the network device failure. For example, the controller may determine from a rule repository alternative route details including alternate device type, alternate device identification, and alternate device name.

The network event unit controller may also determine subscriber customer systems affected by the network device failure (406). For example, the controller may determine from a subscriber system repository the subscriber customer systems affected by the network device failure. In particular, the network event unit controller may determine, for example, particular customers (e.g., enterprise buyers, cloud service providers, etc.) affected by the network device failure. Network event unit controller may also determine the notification type, e.g., electronic mail, a textual message, a numeric message, and/or an audio message, to notify the subscriber customer system of the network device failure.

Network event unit controller may configure re-routing rules based on the subscriber system information and the alternate path information (408). Re-routing rules provide subscriber systems information on alternate device or port details to which the traffic is re-routed. The network event unit controller may generate payload publication messages based on the network event, re-routing rules, and subscriber information (410). Network event unit controller may store the details of the payload publication messages in a collector repository.

Network event unit controller sends the generated payload publication message to a message channel unit for addition of message identifiers and delivery to affected subscriber customer systems. Network event unit controller may generate one or more network event messages based on the message identifiers and the payload publication message (412), including message headers, message priorities and/or message securities. For example, network event unit controller may generate each of the one or more network event messages to conform to one of Hypertext Transfer Protocol (HTTP) or Java Messaging Service (JMS) such that SDN listeners of subscriber customer systems may receive the network event messages. The controller may further include message security data to define restrictions of the network event message such that respective subscriber customer systems may receive the network event message.

The controller may use the message channel unit to deliver the generated network event messages to respective subscriber customer systems affected by the network device failure, such as enterprise buyers, cloud service providers, support personnel, including cloud exchange provider support personnel or customer support personnel or operator, and/or to support systems (414). Respective subscriber customer systems may receive the network event messages, which provide affected subscriber customer systems with re-routing details/alternate paths that enable software-defined (SDN) listeners of respective subscriber customer systems to work with SDN controllers of a network data center to re-route traffic suggested in the network event message (416).

Once subscriber system receives the network event message, the subscriber customer system validates the network event message for the publisher of the payload publication message and the re-routing rules (418). In this way, the method may automate the delivery of re-routing rules to customer systems that are specifically affected by network device failures.

Figure 4B:
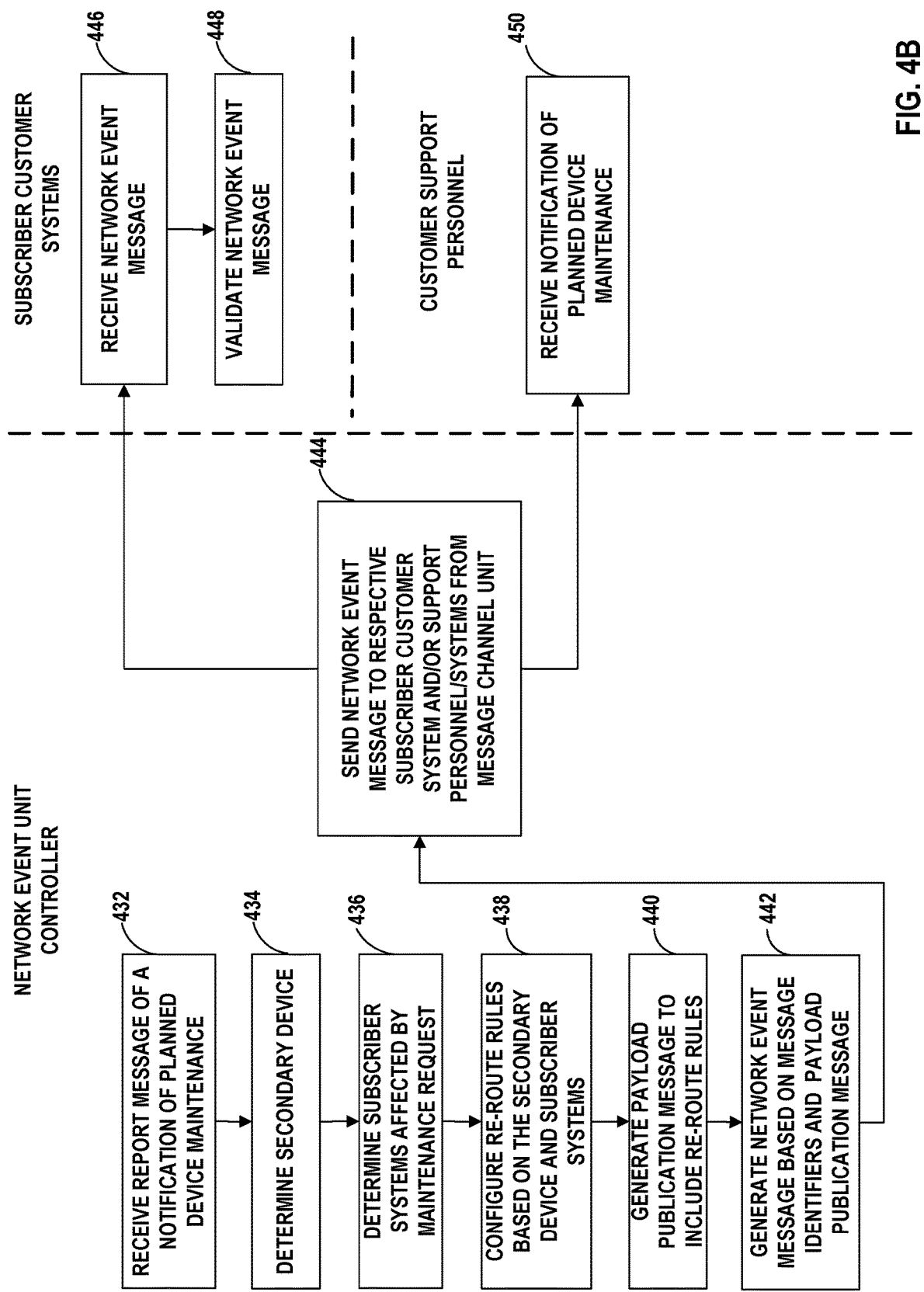
FIG. 4B is an example flowchart of a generation and delivery of payload publication messages for maintenance requests in accordance with the techniques of this disclosure.

FIG. 4B is an example flowchart of a generation and delivery of network event messages for device maintenance in accordance with the techniques of this disclosure. A cloud exchange provider or customer support personnel or operator may initiate a device maintenance request to one of the network devices in the cloud exchange. The network event unit controller may include a SDN controller. In one example, network event unit controller may receive one or more report messages of scheduled device maintenance for a switch or router in a data center of a cloud exchange. To avoid disruption in the service during maintenance, network event unit controller may configure an alternative device and/or path for traffic as the device undergoes maintenance.

Network event unit controller may determine a secondary network device via information stored in the rule repository for altering the traffic channel from the network device scheduled for maintenance (434). To provide details of an alternate device or port to which the traffic is re-routed, the network event unit controller may determine from the rule repository alternate paths for subscriber customer systems affected by the maintenance request. For example, the controller may determine from a rule repository alternative device details including alternate device type, alternate device identification, and alternate device name.

Network event unit controller may also determine subscriber customer systems affected by the maintenance request (436). For example, the controller may determine from a subscriber system repository the subscriber customer systems that have interconnections that traverse the network devices scheduled for maintenance. In particular, network event unit controller may determine, for example, particular interconnected network devices (e.g., routers, switches, etc.) "owned" by customers (e.g., enterprise buyers, cloud service providers, etc.) or used to transport traffic for customers in, e.g., one or more interconnections. Network event unit controller may also determine notification types, e.g., electronic mail, a textual message, a numeric message, and/or an audio message, to notify subscriber systems of the maintenance request and to provide details of an alternate device to which traffic is re-routed.

Network event unit controller may configure re-routing rules based on the subscriber customer system information and the alternate device information (438). Re-routing rules provide subscriber systems information on alternate device or port details to which the traffic is re-routed. The controller of network event unit may generate payload publication messages based on the network event, re-routing rules, and subscriber information (440). Network event unit controller may store the details of payload publication message in the collector repository. For example, network event unit controller stores details associated with the maintenance request, such as details of the device undergoing maintenance, message code, message description, maintenance start and/or end times.

Network event unit controller sends the generated payload publication message to a message channel unit for including message identifiers and delivery to affected subscriber customer systems. The network event unit controller may generate one or more network event messages based on the message identifiers and the payload publication message (442). For example, network event unit controller may generate each of the one or more network event messages to conform to one of Hypertext Transfer Protocol (HTTP) or Java Messaging Service (JMS) such that SDN listeners of subscriber customer systems may identify payload publication messages. The controller may further append message securities to define restrictions of the payload publication message such that respective subscriber customer systems may receive the payload publication message.

The message channel unit may deliver the generated network event messages to respective subscriber customer systems affected by the device maintenance, such as enterprise buyers, cloud service providers, support personnel, including cloud exchange provider support personnel or customer support personnel or operator, and/or to support systems (444). Respective subscriber customer systems may receive the network event messages, which provide affected subscriber customer systems with re-routing/alternative path details that enable software-defined (SDN) listeners of respective subscriber customer systems to work with SDN controllers of a network data center to re-route traffic suggested in the network event message (446).

Once subscriber system receives the network event message, the subscriber customer system validates the payload publication message for the publisher of the network event message and the re-routing rules (448). In this way, the method may automate the delivery of re-routing rules to customer systems that are specifically affected by network device maintenance procedures.

Network event unit controller may further send a notification to customer support personnel to inform the customer support personnel of the device maintenance (450).

Figure 4C:
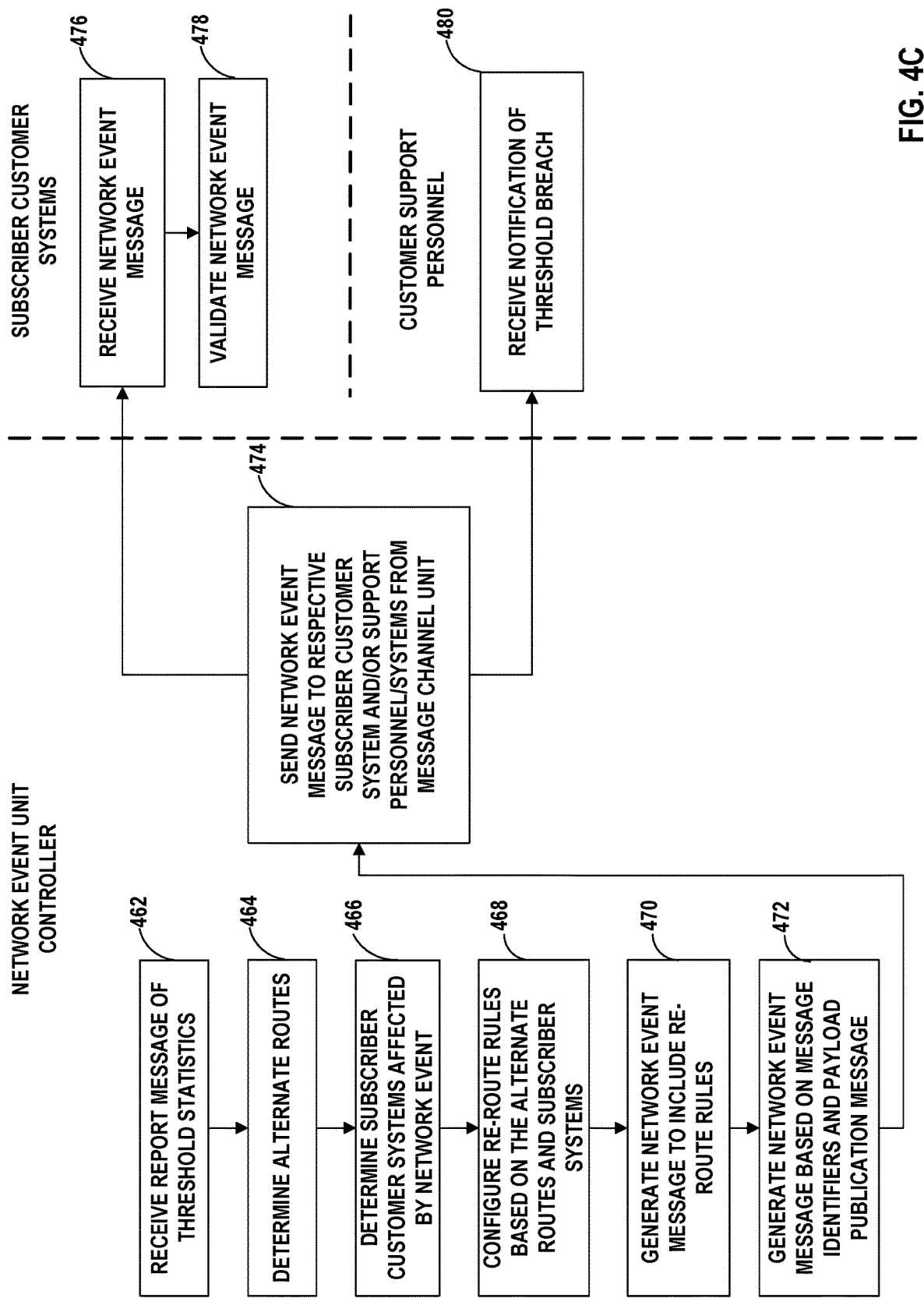
FIG. 4C is an example flowchart of a generation and delivery of payload publication messages for a threshold breach in accordance with the techniques in this disclosure.

FIG. 4C is an example flowchart of a generation and delivery of network event messages for a threshold breach in accordance with the techniques in this disclosure. The network event unit controller may include a SDN controller. In one example, network event unit controller may receive one or more report messages of a threshold breach, such as network traffic exceeding a threshold, in a data center of a cloud exchange (462).

Network event unit controller may determine alternate paths corresponding to a threshold breach via information stored in the rule repository (464). To balance the network traffic of the cloud service, network event unit controller may determine from the rule repository alternate corrective paths for subscriber customer systems affected by the threshold breach. For example, the controller may determine from a rule repository alternative path details to balance the load including alternate device type, alternate device identification, and alternate device name.

Network event unit controller may also determine subscriber customer systems affected by the threshold breach (466). For example, the controller may determine from a subscriber system repository the subscriber customer systems affected by the threshold breach. In particular, network event unit controller may determine, for example, particular network devices (e.g., routers, switches, etc.) "owned" by customers (e.g., enterprise buyers, cloud service providers, etc.) that have breached a threshold. Network event unit controller may also determine notification types, e.g., electronic mail, a textual message, a numeric message, and/or an audio message, to notify subscriber systems of the threshold breach.

Network event unit controller may configure re-routing rules based on the subscriber customer system information and the alternate path information (468). Re-routing rules provide subscriber customer systems information on secondary device or port details to load-balance the network traffic. Network event unit controller may generate payload publication messages based on the re-routing rules (470). Network event unit controller may store the details of the payload publication messages in a collector repository. Network event unit controller stores details associated with threshold statistics, such as threshold type (e.g., bandwidth), configured threshold limit, threshold breach value, and unit of measure. For example, when the network bandwidth of a router in the cloud exchange exceeds a configured limit, the collector stores this information in the collector repository.

Network event unit controller sends the generated payload publication message to a message channel unit for including message identifiers and delivery to affected subscriber customer systems. Network event unit controller may generate one or more network event messages based on the message identifiers and the payload publication message (472). For example, network event unit controller may generate each of the one or more network event messages to conform to one of Hypertext Transfer Protocol (HTTP) or Java Messaging Service (JMS) such that SDN listeners of subscriber customer systems may identify payload publication messages. The controller may further append message securities to define restrictions of the payload publication message such that respective subscriber customer systems may receive the payload publication message.

The message channel unit may deliver the generated network event messages and to respective subscriber customer systems affected by the threshold breach, such as enterprise buyers, cloud service providers, support personnel, including cloud exchange provider support personnel or customer support personnel or operator, and/or to support systems (474). Respective subscriber customer systems may receive the network event messages, which provide affected subscriber customer systems with re-routing/alternative path details that enable software-defined (SDN) listeners of respective subscriber customer systems to work with SDN controllers of a network data center to rebalance the traffic load suggested in the network event message (476).

Once subscriber system receives the network event message, the subscriber customer system validates the payload publication message for the publisher of the network event message and the re-routing rules (478). In this way, the method may automate the delivery of re-routing rules to customer systems that are specifically affected by a threshold breach.

Network event unit controller may further send a notification to customer support personnel to inform the customer support personnel of the threshold breach (480).

Figure 5:
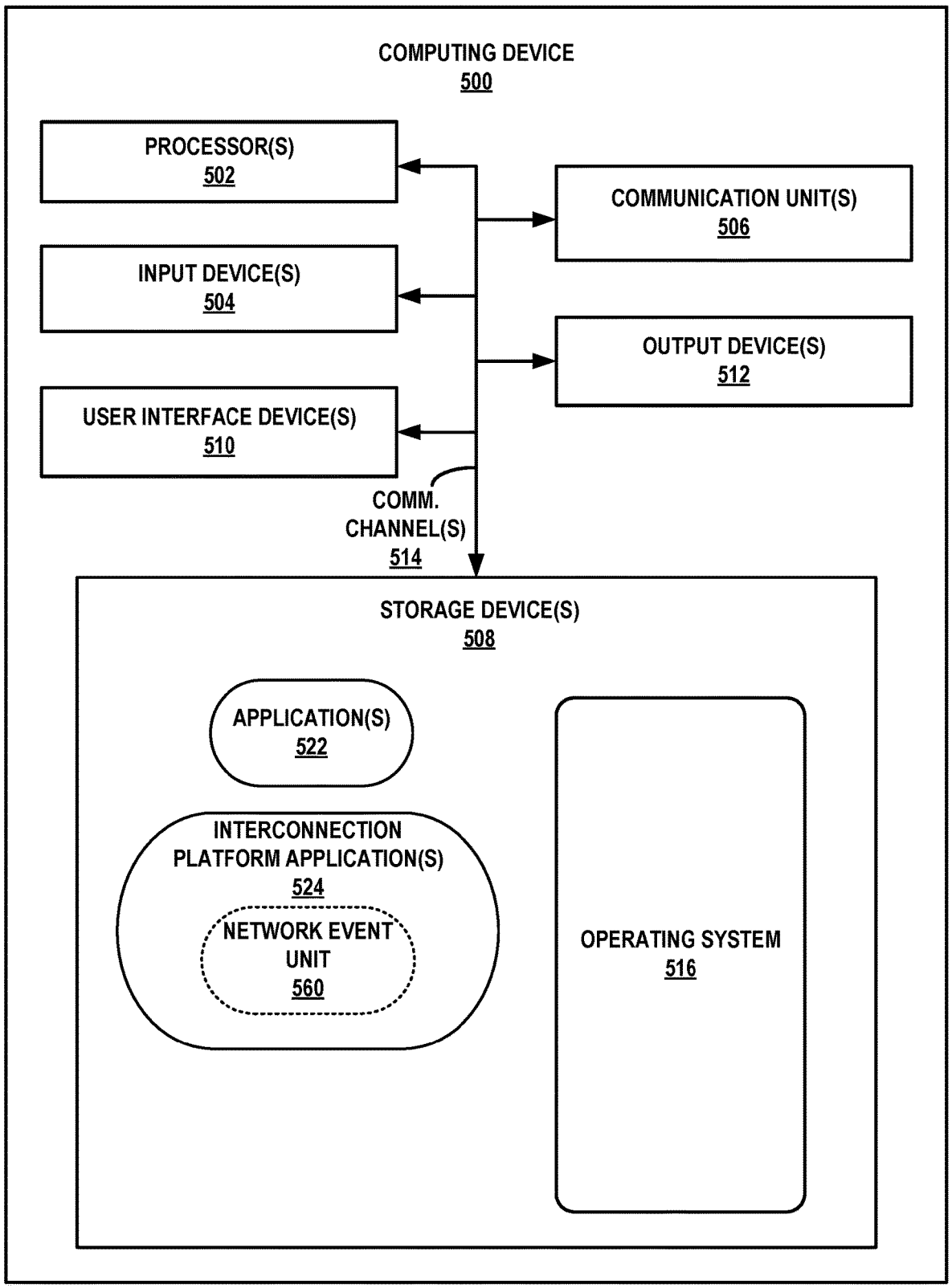
FIG. 5 is a block diagram illustrating further details of one example of a computing device that operates in accordance with one or more techniques of the present disclosure.

FIG. 5 is a block diagram illustrating further details of one example of a computing device that operates in accordance with one or more techniques of the present disclosure. FIG. 5 may illustrate a particular example of a server or other computing device 500 that includes one or more processor(s) 502 for executing any one or more of network event unit 124, interconnection platform 120, or any other interconnection platform or network event unit described herein. Other examples of computing device 500 may be used in other instances. Although shown in FIG. 5 as a stand-alone computing device 500 for purposes of example, a computing device may be any component or system that includes one or more processors or other suitable computing environment for executing software instructions and, for example, need not necessarily include one or more elements shown in FIG. 5 (e.g., communication units 506; and in some examples components such as storage device(s) 508 may not be co-located or in the same chassis as other components). Computing device 500 may be located and execute, for example, within any of cloud exchange points 128, another interconnection facility, or at a branch office or cloud computing environment employed or used by a cloud exchange provider. Multiple computing devices 500 may execute corresponding instances of interconnection platform applications 524 in a distributed manner. In some cases, each of the multiple computing devices 500 may execute different combinations of interconnection platform applications 524. In other words, a computing device 500 may not execute each of interconnection platform applications 524.

As shown in the specific example of FIG. 5, computing device 500 includes one or more processors 502, one or more input devices 504, one or more communication units 506, one or more output devices 512, one or more storage devices 508, and user interface (UI) device 510, and communication unit 506. Computing device 500, in one example, further includes one or more applications 522, interconnection platform applications 524, and operating system 516 that are executable by computing device 500. Each of components 502, 504, 506, 508, 510, and 512 are coupled (physically, communicatively, and/or operatively) for inter-component communications. In some examples, communication channels 614 may include a system bus, a network connection, an inter-process communication data structure, or any other method for communicating data. As one example, components 502, 504, 506, 508, 510, and 512 may be coupled by one or more communication channels 514. Computing device 500 may be located and execute, for example, within any of cloud exchange points 128, another interconnection facility, or at a branch office or cloud computing environment employed or used by a cloud exchange provider.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and interconnection platform application(s) 524 with processors 502, communication unit 506, storage device 508, input device 504, user interface devices 510, and output device 512.

Application 522 and interconnection platform application(s) 524 may also include program instructions and/or data that are executable by computing device 500. Example interconnection platform application(s) 524 executable by computing device 500 may include network event unit 560.

Network event unit 560 may include instructions for causing computing device to perform one or more of the operations and actions described in the present disclosure with respect to network event unit 124. As one example, network event unit 560 may include instructions that cause computing device 500 to generate network event messages associated with one or more network events of interconnection assets of a network data center for delivery, in accordance with a network service bus, to customer systems (e.g., "subscriber systems" or "subscribed customer systems") in accordance with the techniques of this disclosure.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
  receiving, by an interconnection platform for configuring a plurality of interconnection assets of a network data center to interconnect a plurality of customer systems co-located in the network data center, a network device report message indicating a network event affecting an interconnection asset of the plurality of interconnection assets;
  in response to receiving the network device report message, determining, by the interconnection platform and from a repository that stores information identifying each of the plurality of interconnected customer systems interconnected using the plurality of interconnection assets and a plurality of re-routing rules corresponding to a plurality of network events, one or more interconnected customer systems that are interconnected with the interconnection asset affected by the network event;
  determining, by the interconnection platform and from the repository, an alternative path for the one or more interconnected customer systems to a different interconnection asset of the plurality of interconnection assets to avoid the interconnection asset affected by the network event, wherein the alternative path is determined from one of the plurality of re-routing rules associated with the network event affecting the interconnection asset;
  generating, by the interconnection platform, a network event message based on the network event, wherein the network event message includes port details of the interconnection asset that generated the network event and port details of the different interconnection asset; and sending, by the interconnection platform, the network event message to the one or more interconnected customer systems to provide the one or more interconnected customer systems the port details of the interconnection asset that generated the network event and port details of the different interconnection asset to which the one or more interconnected customer systems uses to redirect network traffic within the network data center to the different interconnection as set.

2. The method of claim 1,
wherein determining one or more interconnected customer systems that are interconnected with the interconnection asset affected by the network event comprises determining, by the interconnection platform and based on information from the repository, the network event affects network traffic transport by an interconnection between a first customer system and a second customer system of the plurality of customer systems, and
wherein determining the alternative path for the one or more interconnected customer systems to avoid the interconnection asset affected by the network event comprises determining, based on the information from the repository, an alternate_path for the interconnection that does not include the interconnection asset affected by the network event and that does include the different interconnection asset of the plurality of interconnection assets that interconnects the first customer system and the second customer system.

3. The method of claim 1, wherein generating the network event message based on the network event comprises: generating a message security value associating the network event message with the one or more interconnected customer systems.

4. The method of claim 1, wherein the different interconnection asset comprises a port of network infrastructure of the network data center coupled to the one or more interconnected customer systems by a network link, wherein the port is associated with the port details of the different interconnection asset.

5. The method of claim 1, further comprising sending, by the interconnection platform, the network event message to a customer support operator, wherein the network event message comprises at least one of an electronic mail, a textual message, a numeric message, and an audio message.

6. The method of claim 1, wherein the network device report message comprises a failure notification of a failed interconnection asset, wherein the failure notification comprises: device details of the failed interconnection asset; and a request to re-route network traffic for the failed interconnection asset to another one of the plurality of interconnection assets.

7. The method of claim 1, wherein the network device report message comprises a maintenance request for one of the plurality of interconnection assets, wherein the maintenance request comprises: a notification for a scheduled maintenance of the one of the plurality of interconnection assets; and a request to re-route network traffic for the one of the plurality of interconnection assets to another one of the plurality of interconnection assets, wherein the network event message includes an indication of the scheduled maintenance.

8. The method of claim 1, wherein the network device report message indicates a threshold breach by the one of the plurality of interconnection assets, and wherein the network event message includes an indication of the threshold breach.

9. The method of claim 1, wherein receiving the network device report message comprises receiving, by the interconnection platform from one of a network device of the plurality of interconnection assets and a software-defined networking controller that configures the plurality of interconnection assets, the network device report message.

10. The method of claim 1, wherein generating the network event message comprises:
generating a first network event message for a first software-defined networking controller that configures a first customer system of the plurality of customer system; and
generating a second network event message for a second software-defined networking controller that configures a second customer system of the plurality of customer systems.

11. The method of claim 10, wherein the first network event message comprises one of a Java Message Service message and a HyperText Transfer Protocol message.

12. The method of claim 1, wherein a first customer system of the plurality of customer systems comprises a cloud service provider network, and wherein a second customer system of the plurality of customer systems comprises an enterprise network.

13. The method of claim 1, wherein the interconnection platform configures the plurality of interconnection assets as a cloud exchange to interconnect the plurality of customer systems.

14. A cloud exchange comprising:
an interconnection platform having at least one processor coupled to a memory, wherein the interconnection platform executes software to configure a plurality of interconnection assets of a network data center to interconnect customer systems of a plurality of customer systems co-located in the network data center, the interconnection platform comprising:
a network event unit controller configured for execution by the at least one processor to: receive a network device report message that provides an indication of a network event affecting an interconnection asset of the plurality of interconnection assets;
in response to receiving the network device report message, determine, from a subscriber system repository that stores information identifying each of the plurality of interconnected customer systems interconnected using the plurality of interconnection assets, one or more interconnected customer systems that are interconnected with the interconnection asset affected by the network event;
determine, from a rule repository that stores a plurality of re-routing rules corresponding to a plurality of network events, an alternative path for the one or more interconnected customer systems to a different interconnection asset of the plurality of interconnection assets to avoid the interconnection asset affected by the network event, wherein the alternative path is determined from one of the re-routing rules associated with the network event affecting the interconnection as set;
generate a network event message based on the network event, wherein the network event message includes port details of the interconnection asset that generated the network event and port details of the different interconnection asset; and send the network event message to the one or more interconnected customer systems to provide the one or more interconnected customer systems the port details of the interconnection asset that generated the network event and port details of the different interconnection asset to which the one or more interconnected customer systems uses to redirect network traffic within the network data center to the different interconnection asset.

15. The cloud exchange of claim 14, wherein the interconnection platform further comprises:

the rule repository for storing re-routing information usable for generating the re-route rules for the one or more interconnected customer systems affected by the network event of the interconnection asset;

the subscriber system repository for storing the customer information on the one or more interconnected customer systems subscribed to receive network event messages from the interconnection platform; and a message channel unit configured for execution by the at least one processor to send the network event message to the one or more interconnected customer systems.

16. The cloud exchange of claim 15, wherein the rule repository comprises: an events registry for storing one or more network event types corresponding to the plurality of interconnection assets;

a device threshold registry for storing one or more network traffic threshold values for triggering, by the interconnection platform, generating the network event message when network traffic of one of the interconnection assets exceeds the one or more network traffic threshold values; and a device failures registry for storing data usable for re-routing the one or more interconnected customer systems affected by the network event of the interconnection asset and subscribed to receive network event messages from the interconnection platform.

17. The cloud exchange of claim 15, wherein the subscriber system repository comprises:

a device registry for storing information on one or more network devices of the one or more interconnected customer systems, the one or more network devices coupled to the interconnection asset affected by the network event; a customer registry for storing information on one or more customers using the interconnection asset affected by the network event; and a notification registry for storing notification types comprising at least one of an electronic mail, a textual message, a numeric message, and an audio message.

18. The cloud exchange of claim 15, wherein the message channel unit further comprises:

one or more message security values for associating the network event message with the one or more interconnected customer systems.

19. A system comprising:

a network data center comprising a plurality of interconnection assets, the plurality of interconnection assets comprising a plurality of ports by which a customer system associated with a customer of a provider of the network data center;

an interconnection platform comprising one or more processors operably coupled to a memory, wherein the interconnection platform executes software configured to interconnect customer systems of a plurality of customer systems co-located in the network data center, the interconnection platform comprising:

a network event unit controller configured for execution by the one or more processors to: receive a network device report message that provides an indication of a network event affecting an interconnection asset of the plurality of interconnection assets; in response to receiving the network device report message, determine, from a subscriber system repository, one or more interconnected customer systems that are interconnected with the interconnection asset affected by the network event;

determine, from a rule repository, an alternative path for the one or more interconnected customer systems to a different interconnection asset of the plurality of interconnection assets to avoid the interconnection asset affected by the network event, wherein the alternative path is determined from one of re-routing rules associated with the network event affecting the interconnection asset;

generate a network event message based on the network event, wherein the network event message includes port details of the interconnection asset that generated the network event and port details of the different interconnection asset; and send the network event message to the one or more interconnected customer systems to provide the one or more interconnected customer systems the port details of the interconnection asset that generated the network event and port details of the different interconnection asset to which the one or more interconnected customer systems uses to redirect network traffic for an interconnection to the different interconnection asset;

the rule repository for storing re-routing information usable for generating the re-route rules for the one or more interconnected customer systems affected by the network event of the interconnection asset;

the subscriber system repository for storing the customer information on the one or more interconnected customer systems subscribed to receive network event messages from the interconnection platform; and a message channel unit configured for execution by the one or more processors to send the network event message to the one or more interconnected customer systems; and the customer system comprising different one or more processors operably coupled to a different memory, wherein the customer system executes software configured to receive the network event message, wherein the network event message provides the customer system the port details of the interconnection asset that generated the network event and port details of the different interconnection asset to which the one or more interconnected customer systems uses to redirect network traffic within the network data center to the different interconnection asset.

* * * * *